United States Patent
Linton et al.

(10) Patent No.: US 11,410,675 B2
(45) Date of Patent: Aug. 9, 2022

(54) COLLECTING AUDIO SIGNATURES USING A WIRELESS DEVICE

(71) Applicant: International Business Machines Corporation, Armonk, NY (US)

(72) Inventors: Jeb R. Linton, Manassas, VA (US); Jonathan Samn, Austin, TX (US); Poojitha Bikki, Austin, TX (US); Naeem Altaf, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 172 days.

(21) Appl. No.: 16/937,734

(22) Filed: Jul. 24, 2020

(65) Prior Publication Data

US 2022/0028413 A1    Jan. 27, 2022

(51) Int. Cl.
*H04R 29/00* (2006.01)
*G10L 25/51* (2013.01)
*H02S 40/38* (2014.01)
*A01K 29/00* (2006.01)
*G06F 16/61* (2019.01)
*H04W 84/04* (2009.01)

(52) U.S. Cl.
CPC ............ *G10L 25/51* (2013.01); *A01K 29/005* (2013.01); *G06F 16/61* (2019.01); *H02S 40/38* (2014.12); *H04W 84/042* (2013.01)

(58) Field of Classification Search
CPC ......... G10L 25/51; H02S 40/38; G06F 16/61; A10K 29/005
See application file for complete search history.

(56) References Cited

U.S. PATENT DOCUMENTS

| | | | |
|---|---|---|---|
| 2003/0125946 A1* | 7/2003 | Hsu | G10L 17/26 704/E17.002 |
| 2018/0007673 A1 | 1/2018 | Fwu et al. | |
| 2020/0159720 A1* | 5/2020 | Leong | G06F 16/2365 |

FOREIGN PATENT DOCUMENTS

| | | |
|---|---|---|
| CN | 103905559 A | 7/2014 |
| CN | 206619949 U | 11/2017 |
| CN | 108922548 A | 11/2018 |

OTHER PUBLICATIONS

"Method and System for Multi-perception Cognitive Mapping," IP.Com, An IP.com Prior Art Database Technical Disclosure, IP.com No. IPCOM000236870D, IP.com Electronic Publication Date: May 20, 2014, 3 pages.

Gage et al., "Acoustic Observations in Agricultural Landscapes," The Ecology of Agricultural Landscapes: Long-Term Research on the Path to Sustainability. Oxford University Press, New York, NY, 2015, 18 pages.

(Continued)

*Primary Examiner* — Simon King
(74) *Attorney, Agent, or Firm* — Jared C. Chaney

(57) ABSTRACT

An animal audio signature may be collected by a solar powered sound collection device. The solar powered collection device may use a supercapacitor to store power. The animal audio signature may be compared to a database of known animal audio signatures. The database may contain one or more identities for each of the known animal audio signatures. A known animal audio signature that matches the collected animal audio signature may be identified. An identity associated with the known animal audio signature may be transmitted to a data repository over a 5G wireless network.

19 Claims, 6 Drawing Sheets

(56) References Cited

OTHER PUBLICATIONS

Kulyukin et al., "Toward Audio Beehive Monitoring: Deep Learning vs Standard Machine Learning in Classifying Beehive Audio Samples," Applied Sciences, Sep. 6, 2018, 33 pages.
Zgank, "Bee Swarm Activity Acoustic Classification for an IoT-Based Farm Service," MDPI, Sensors, Dec. 19, 2019, 14 pages.
Mell et al., "The NIST Definition of Cloud Computing," Recommendations of the National Institute of Standards and Technology, U.S. Department of Commerce, Special Publication 800-145, Sep. 2011, 7 pages.

* cited by examiner

COLLECTING AUDIO SIGNATURES USING A WIRELESS DEVICE

BACKGROUND

Aspects of the present disclosure relate to collecting audio signatures using a wireless device; more particular aspects relate to transmitting animal data using wireless signals.

Wildlife monitoring is essential for keeping track of animal movement patterns, habitat utilization, population demographics, snaring incidents, poaching incidents, and breakouts. Conservation specialists gather that this valuable information has numerous management applications, including the planning of successful introduction and removal strategies of wildlife.

SUMMARY

The present disclosure provides a method, computer program product, and system of collecting audio signatures using a wireless device. Some embodiments of the present disclosure may be illustrated by a method comprising collecting, by a solar powered sound collection device, an animal audio signature. The solar powered collection device may use a supercapacitor to store power. The method may also comprise comparing the animal audio signature to a database of known animal audio signatures. The database may contain one or more identities for each of the known animal audio signatures. The method may also comprise identifying, based on the comparing, a known animal audio signature that matches the collected animal audio signature. Finally, the method may also comprise transmitting an identity associated with the known animal audio signature to a data repository over a 5G wireless network.

Some embodiments of the present disclosure can be illustrated by a method comprising collecting, by a sound collection device, an animal audio signature. The method may also comprise comparing the animal audio signature to a database of known animal audio signatures. The database may contain one or more identities for each of the known animal audio signatures. The method may also comprise identifying, based on the comparing, a known animal audio signature that matches the collected animal audio signature. Finally, the method may also comprise transmitting an identity associated with the known animal audio signature to a data repository.

Some embodiments of the present disclosure can also be illustrated by a computer program product comprising a computer readable storage medium having program instructions embodied therewith, the program instructions executable by a computer to cause the computer to collect, by a solar powered sound collection device connected to the computer, an animal audio signature. The solar powered collection device may use a supercapacitor to store power. compare the animal audio signature to a database of known animal audio signatures. The database may contain one or more identities for each of the known animal audio signatures. The computer may identify, based on the comparing, a known animal audio signature that matches the collected animal audio signature. Finally, the computer may transmit an identity associated with the known animal audio signature to a data repository over a 5G wireless network.

The above summary is not intended to describe each illustrated embodiment or every implementation of the present disclosure.

DETAILED DESCRIPTION

Animal migration tracking is used in wildlife biology, conservation biology, ecology, and wildlife management to study animals' behavior in the wild. One of the first techniques was bird banding, placing passive ID tags on bird's legs, to identify the bird in a future catch-and-release. Radio tracking involves attaching a small radio transmitter to the animal and following the signal with a RDF receiver. Sophisticated modern techniques global positioning system (GPS) use satellites to track tagged animals, and GPS tags which keep a log of the animal's location. One of the many goals of animal migration research has been to determine where the animals are going; however, researchers also want to know why they are going "there." Researchers not only look at the animals' migration but also what the population of animals in small areas is. This information can be used to determine if a species is moving to new locations based on food density, a change in water temperature, or other stimulus, and the animal's ability to adapt to these changes.

Animal area density data is being used to address environmental challenges such as climate and land-use changes, biodiversity loss, invasive species, and the spread of infectious diseases. Animal area density data helps improve understanding in how individuals and populations move within local areas and migrate across oceans and continents.

One of the major issues with conventional systems of gathering animal area density determination and animal identification is that these conventional systems and methods are resource intensive. In some embodiments, a method for automatically identifying animal sounds with a low power wireless device is proposed. By combining cognitive computing with modern solar cells and supercapacitors, animal audio signatures may be collected and identified, and the identification may be sent over a wireless network in a manner that is substantially less resource-intensive than conventional methods. By automating the identification in the same device that records the sounds, fewer resources need to be committed to storing and processing the audio recordings. By using devices powered by solar cells and remote transmitters, devises may be distributed to remote regions without the need to draw resources off a power grid.

Figure 1:
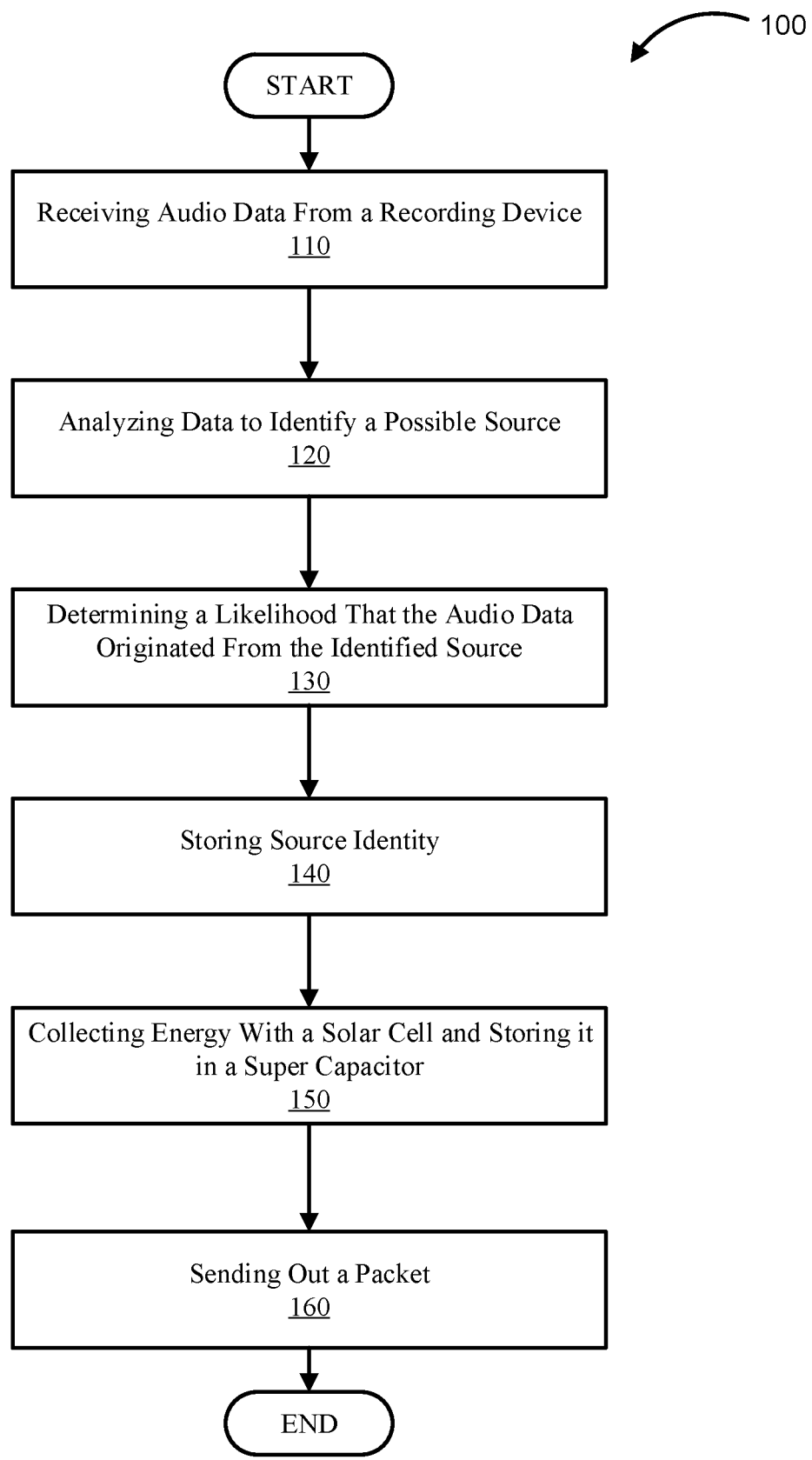
FIG. 1 illustrates a flowchart of an example method of collecting audio signatures using a wireless device according to various embodiments of the present disclosure.

FIG. 1 shows an example method 100 collecting audio signatures using a wireless device.

In block 110 audio data from a recording device is received. In some embodiments, the recording device includes a microphone or a hydrophone set to record ambient sounds. A microphone is a device, such as a transducer, that converts sound into an electrical signal. A hydrophone is similar to a microphone, but is configured for use in water.

Audio data could be gathered via several types of microphones that utilize different methods to convert the air pressure variations of a sound wave to an electrical signal. Example microphones include: the dynamic microphone, which uses a coil of wire suspended in a magnetic field; the condenser microphone, which uses the vibrating diaphragm as a capacitor plate; and the piezoelectric microphone, which uses a crystal of piezoelectric material. Microphones typically need to be connected to a preamplifier before the signal may be recorded or reproduced.

In some embodiments, the recording device is configured to record only when a sound is detected. For example, in some embodiments, the recording device may normally be off, but may be configured to turn on and record when a sound is detected. In some other embodiments, the recording device may normally be on, but may be configured to record only when a sound is detected. In some embodiments, the recording device is set to record continually.

In some embodiments, one or more recording devices may be distributed over an area and send a signal back to a central unit. In some embodiments, the signal may be sent through one or more wires or over a wireless network. In some embodiments, a single device may have multiple microphones pointing in different directions.

In some embodiments, readings of other ambient conditions may also be recorded. This may be useful because some animal noises may be affected by other ambient conditions such as temperature, pressure, light exposure, amount of daylight, wind, and humidity among others. In some embodiments, the system may use ambient conditions to help determine what animals are present and how many animals are present since the same or similar noises may be indicative of different animals or a different number of animals in different ambient conditions. Recording ambient conditions in addition to these animal noises may help to correlate changes in the animal noises to the ambient conditions. For example, Doradid catfishes produce stridulation sounds by rubbing the pectoral spines in the shoulder girdle and drumming sounds by an elastic spring mechanism, which vibrates the swimbladder. The Doradid catfishes' stridulation sounds are affected by ambient conditions in a distinctive way: they are shorter at higher temperatures, whereas the pulse number, maximum pulse period and sound pressure level do not change with temperature. In another example, some species of crickets chirp at higher rates as the temperature increases (about 62 chirps per minute at 13° C. (55° F.) in one common species, whereas other species may have different rates at 13° C.). In some embodiments, the ambient readings may be recorded along with audio data so that it may be used during analyzing. For example, 62 chirps a min at 13° C. might mean one member of cricket species "A," whereas 62 chirps a min at 20° C. might mean two member of cricket species "B."

In block 120, the audio data is analyzed to identify one or more possible sources. In some instances, the source may be an animal. For example, the sounds may be made from a fish rubbing its pectoral spines, a cricket rubbing its legs together, or a bird singing. In some embodiments, the data may come from multiple sources. For example, the audio data might include sounds of two crickets and one blue jay.

In some instances, multiple possible sources may be identified for the audio data where only one source may be correct. In these instances, a determination of the likelihood for each source would be made in block 130. For example, following the cricket example from above, both one member of cricket species "A" and two members of cricket species "B" may be selected as possible sources. In this example, evaluation of which is the most likely source would be performed in block 130.

In some embodiments, the data may be analyzed to determine key features of the sound. In some embodiments, a detected sound may indicate what animal is present near the microphone. For example, the frequencies of whale songs of different whale species differ in frequency. A blue whale vocal range is between 10 and 100 hertz, whereas baleen whales make sounds at about 15-20 hertz. Thus, analyzing a sound that is identified as a 50 Hz whale sound may enable a system to identify a blue whale. In some embodiments, the system may derive other information based on the sound. For example, in recent years the blue whales have begun to make a lower-pitch sound instead of higher-pitched sounds. Experts believe that this is due to the rising population of blue whales leading to an increased population density and therefore decreased distance between the average pair of blue whales. By contrast, when there were fewer blue whales their vocalizations needed to travel further. Because it is easier for blue whales to make high-frequency sounds powerful enough to travel long distances, blue whales relied more on high-frequency sounds.

In some instances, the number of times a sound is produced in a fixed time period can indicate how many animals are present. For example, according to Dolbear's law, the number of times snowy tree cricket chirps in 14 seconds is equal to the temperature in Fahrenheit minus 40. Thus, if the temperature is 55 degrees Fahrenheit and 30 snowy tree cricket chirps are recorded in 14 seconds, two crickets are likely present (55 degrees-40=15 chirps every 14 seconds, so one cricket may chirp 15 times in a 14 seconds). In some embodiments, a variety of audio characteristics may be used to determine the type and number of animals present. For example, bird songs contain complex tones, rhythms, and patterns, all of which may be analyzed and qualified/quantified to determine the type and number of birds that are present based on these bird songs. In some embodiments, the data may be analyzed for information indicative of an anomaly that should be disregarded. The system may have reading thresholds where noises above a high threshold and noises below a low threshold would be disregarded. For example, there may be a volume threshold where any noise below a threshold volume would be disregarded. In one instance, a very quiet sound, such as the wind or rustling of branches, may be below this sound threshold and be disregarded. In another example, noises above a certain frequency threshold may be disregarded since animals may not be capable of making noises above a certain frequency. For instance, bats can make noises up to about 200,000 hertz, but some electronic equipment may make noises above 200,000 hertz. Therefore, the system may disregard any noise above 200,000 hertz. In some embodiments, thresholds may be a numerical value of a tone, frequency, volume, or other another audio factor. In some embodiments, the system may determine that some instances of reading thresholds may be affected by ambient conditions where the range of sounds that should be disregarded may change. For example, high winds might increase the sounds rustling branches make and thus the threshold for ruling out those sounds would need to be increased in a wind storm.

In some embodiments the analyzation may be performed by an artificial neural network.

In some embodiments, block 120 may be performed as a first distinct step of identifying possible sources that may have been the source of audio data and block 130 may be performed as a second step of ranking the possible sources. Following the example from above, a blue whale vocal range is between 10 and 100 hertz, whereas baleen whales make sounds at about 15-20 hertz. Thus, in block 120, analyzing audio data that is identified as a 15 Hz whale sound, an 18 Hz whale sound, and a 19 Hz whale sound may enable a system to identify both a blue whale and a baleen whale as a possible source, because both whale species are capable of making sounds of all three of those frequencies. However, in block 130, the system may take the possible sources and identify which is the most likely source or determine the probability that each whale species may be the source. For example, the system determine in block 120 that it is unusual for a blue whale to make three consecutive sounds in a frequency range that is narrow, as compared to the blue whale's typical vocal range. For this reason block 130 it may determine that a baleen whale is the most likely source.

In some applications, 130 is a more in-depth process than 120. For example, in block 120 it may be determined that cricket species "A" and cricket species "B" both satisfy a threshold requirement to be considered a possible source. In block 130 a more in-depth analysis is done to determine the likelihood of each source or which source is the most likely (e.g., which matches more closely).

In some applications, however, block 120 and block 130 may be performed in a single step.

At block 130, the system determines a likelihood that the audio data originated from the source or sources identified in block 120. This determination may be based on any combination of the analyses of relationship information discussed herein. For example, via deep-learning a neural network may process a multi-dimensional vector that expresses various entity-relationship information relating to a source identified as a possible match for the audio data. That neural network may output a value that expresses the confidence with which the neural network matches the identified source and the audio content. For example, an output value of 0.0 may represent a 0% confidence that the audio data originated from the identified source, whereas an output value of 1.0 may represent a 100% confidence that the audio data originated from the identified source. In other embodiments, two values may be output by the neural network: a first value that expresses a confidence that the that audio data originated from the identified source, and a second value that expresses a confidence that the audio data does not come from any other animal noises. In some such embodiments, these two values may add up to 100% confidence (e.g., 1.0).

In some embodiments, block 130 may use the analysis of 120 to determine the likelihood that audio data originated from the source, each source, or groups of sources identified in block 120. In some embodiments, block 130 may use the analysis of 120 to determine the most likely source(s) out of all the sources identified in 120. For example, it may have been determined that both cricket species "A" and cricket species "B" meet the minimum qualifications to be the potential source, but the frequency of the chirps more closely matched cricket species "A." Therefore, in this example, the system may make a determination that there is a 70% chance that species "A" is the source and a 30% chance that cricket species "B" is the source.

In some embodiments, block 130 may perform additional analysis to determine the likelihood that audio data originated from the source, each source, or groups of sources identified in block 120. For example, it may have been determined that both cricket species "A" and cricket species "B" meet the minimum qualifications to be the potential source using only the frequency of the chirps. The system may then analyze a second factor (e.g., amplitude, pitch, temperature, etc.) and determine, based on that second factor, that cricket species "A" is unlikely to be the source. Therefore, in this example, the system may make a determination that there is a 5% chance that species "A" is the source and a 95% chance that cricket species "B" is the source.

In some embodiments, the analysis of block 120 and determination of block 130 may increase the accuracy with which a cognitive computer system may identify a source of audio data. As a result, a system performing method 100 may be more accurate than a categorization system that, for example, does not consider the implications of other sources (such as ambient sounds) in audio data. Recalling an earlier-discussed example, if a system that does not consider the implications of other sources were analyzing a sound bite with a 17 hz vocalization and a 90 hz vocalization, the system may conclude that a blue whale (the vocal range of which is between 10 and 100 hertz) was present and made both vocalizations. However, in this example the system might not detect the presence of a baleen whale (the vocal range or which is between 15 and 20 hertz) since its vocal range is contained within the blue whale vocal range. However, a system performing method 100 may be more likely to detect both whales based on other information. Content analysis may even be performed on the data for an ambient condition (e.g., whether it is raining, precipitation in inches, wind speed, amount of sunlight, etc.) or ambient noise (e.g., sound of rain, sound of wind, sound of thunder, etc.). In some embodiments, the system may get weather data from a weather service. For example, a rainstorm may decrease the likelihood that a blue jay is an audio source because they don't sing in the rain, whereas the vocalizations of ducks are not typically affected by the presence of rain. The system may consider the presence of a detected rain storm within audio data when considering whether a bird noise within this audio data is a blue jay or a duck, and therein determine that this detected rain storm decreases the likelihood that the bird sound is a blue jay (e.g., as blue jays are less likely to sing in the rain) and increases the likelihood that the bird sound is a duck (e.g., as ducks are largely unaffected by the rain and are more likely to vocalize during the rain).

As discussed, in some embodiments a cognitive computer system may reject or not reject an identified source based on a simple threshold. However, in other embodiments, a more complex certainty threshold may be utilized. For example, in some embodiments any value greater than 70% certainty of a source identity may cause the source to be selected as a source identity, whereas any value lower than 20% certainty may cause a source identity to be rejected. In such embodiments, values between e.g., 20% certainty and 70% certainty may cause a source identity to be flagged as a potential source identity. In some embodiments, potential source identities are possible sources that did not have a high enough certainty score to be recorded as a source identity or a low enough score to be rejected. In some embodiments, sources identities flagged as potential source identities may be flagged for review by human reviewers.

In block 140, after a source identity has been determined, the source identity may be stored in system memory. In some embodiments, a source identity is the name of an animal identified as a source. For example, the source identity of a blue whale may be "blue whale." In some embodiments, the source identity is an alternative designation. For example, if five blue whales are detected and ten humpback whales are detected, the source identity may be stored as "5B 10H," where "B" stands for blue whale and "H" stands for humpback whale. In some embodiments, one or more factors leading to the determination of the source may be stored along with the source identity. For example, following the previous example, if the water temperature is 60 degrees Fahrenheit, the source identity may be "5B 10H 60° F." In some embodiments, a source identity may be a source for a collection of sounds, single sound, audio file, or period of time. Following the example from above, a source identity for one whale song may be 5B10H, where the source identity for a second whale song may be one blue whale or 1B.

In some embodiments, after the audio file has been analyzed and the source has been stored the audio file may be deleted from the system.

In some cases, the system may be deployed in remote areas where ready access to a power grid may not be available. Therefore, in some embodiments, the system may need to be able to operate independent of a wired power source or a wired source of communication.

In block 150, solar energy is collected with a solar cell and stored with a super capacitor.

A solar cell, or photovoltaic cell, is an electrical device that converts the energy of light directly into electricity by the photovoltaic effect, which is a physical and chemical phenomenon. It is a form of photoelectric cell, defined as a device whose electrical characteristics, such as current, voltage, or resistance, vary when exposed to light. Individual solar cell devices may be combined to form modules, otherwise known as solar panels. The common single junction silicon solar cell may produce a maximum open-circuit voltage of approximately 0.5 to 0.6 volts.

In addition to producing energy, solar cells may be used as a photodetector (for example, they may be used as infrared detectors), detecting light or other electromagnetic radiation near the visible range, or measuring light intensity. In some embodiments, the solar cell may be used to determine how much energy the system may use. For example, in times where solar energy is abundant the system may send out a list of source identities every 20 minutes. In times where solar energy is scarce (e.g. night), the system may conserve power by storing the list of source identities and sending them out in the morning when enough energy has been gathered. In some embodiments, the system may perform energy intensive functions when there is a surplus of power. For example, the system may hold off processing audio recordings until the super capacitors are fully charged (e.g., charged to more than 90% of capacity).

A supercapacitor, also called an ultracapacitor, is a high-capacity capacitor with a capacitance value much higher than other capacitors, but with lower voltage limits, that bridges the gap between electrolytic capacitors and rechargeable batteries. It typically stores 10 to 100 times more energy per unit volume or mass than electrolytic capacitors, may accept and deliver charge much faster than batteries, and tolerates many more charge and discharge cycles than rechargeable batteries. In some embodiments, the system may use one or more supercapacitor to store power from the solar cell. In some embodiments, the supercapacitor may be used in conjunction with another power storage component. In some embodiments, the supercapacitor may be the only power storage component.

In block 160, once the sufficient energy has been stored to send a wireless signal, a packet containing one or more source identities may be sent out to a computer system. In some embodiments, the packet of source identities may contain only one source identity, but in some it may contain multiple source identities. In some embodiments, initiating a connection with a wireless network (such as a fifth generation wireless technology low power wide area network) and transmitting the source identities may be a relatively energy demanding task. In some embodiments, it may be more energy efficient to store the source identities until enough power is stored to send the identities as a packet than sending them out individually. In some embodiments, the system may measure a current level of storage of the supercapacitor, determine that the supercapacitor does not have enough power for transmitting one or more identities, and hold (e.g., indefinitely delay until a predetermined condition is met) the processing of audio recordings and/or the transmitting until the supercapacitor has reached a threshold level of stored energy/power (e.g., where this threshold level of stored energy/power is the predetermined condition that indicates to stop holding the data). In some embodiments, the threshold level is enough power to perform the transmitting. In some embodiments, the threshold level is enough power to perform the transmitting and continue receiving and/or analyzing for a set period of time. The set period of time may be a number of hours, an estimated time until power may be available from the solar cell (e.g., sunrise, or weather report of cloud cover), or based on an estimated power availability.

In some embodiments, data (e.g., the source identities, confidence ratings, etc.) may be sent over a network using a low power protocol. In some embodiments, the low power protocol may be implemented using a LPWAN (low power wide area network). LPWANs are new sets of protocols developed for internet of things (IoT) solutions but may also be used by other devices to communicate over a wide area. Cellular networks may provide a wide-area communication network, but the cost of communication over cellular networks is high because of its high power consumption. In some embodiments, an LPWANs may enable communications between the system and a computer receiving the data over a wide area with the help of small and inexpensive supercapacitor charged by solar power.

In some embodiments, the LPWAN may be a fifth generation wireless technology (5G) LPWAN. Designed specifically to allow long-range communications up to 10-40 km in rural zones and 1-5 km in urban zones, LPWAN devices typically carry a battery life of 4+ years thanks to energy saving coding called sleep mode. Some immediate externalities of LPWAN include immense cost savings (thanks to lack of wires), simpler application development and operating costs (in part, thanks to the advancement of decentralized networks which was developed in tandem with connectivity advancements), and a greater range to serve rural applications for businesses, safety organizations, and researchers. As a result of these features, LPWAN-enabled hardware can be located at places where it is difficult and/or impossible for people to safely go.

In some embodiments, 5G technology may be used in conjunction with LPWAN to slow down communications in order to increase range and decrease power consumption. In some embodiments, this set of 5G technologies may enable integrating wireless communications into small, ultra-low power devices to perform the embodiments described herein.

In some embodiments, a mesh network of devices may be used. A mesh refers to an interconnection network of devices that are made up of devices organized in a mesh topology.

Mesh topology is a networking infrastructure in which all connected devices may cooperate to transfer and share data amongst each other. In some embodiments, a mesh network has all devices sending data through a single designated device. In some embodiments, the mesh network may send out data based on power scheduling. For example, if transmitting between devices takes less power, but transmitting through a 5G network takes more power, devices in a mesh network may rotate which device sends the data over the 5G network.

Figure 2:
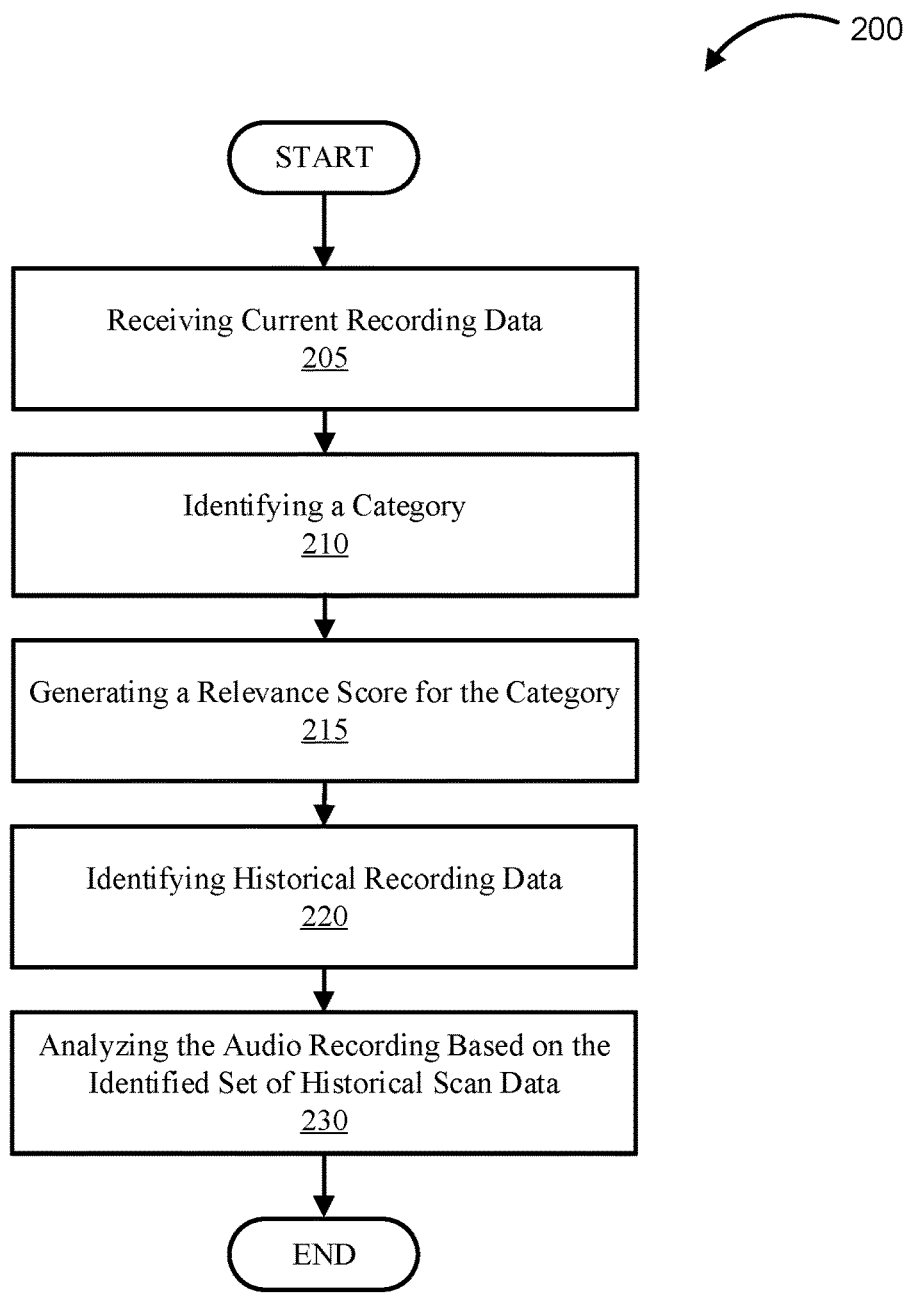
FIG. 2 illustrates a flowchart of an example method for identifying a source of an audio recording based on historical data, in accordance with embodiments of the present disclosure.

FIG. 2 illustrates a flowchart of an example method 200 for identifying a source of a current audio data based on historical data, in accordance with embodiments of the present disclosure. In some embodiments, method 200 may represent block 120 of method 100 (shown in FIG. 1). Method 200 may begin at block 205, where current audio data from a sensor (e.g., recording device, microphone, thermometer, solar cell, etc.) is received. As discussed herein, a current audio data may also include metadata tags with temperature data, wind data, humidity data, precipitation data, light data, etc.

In some embodiments, historical data includes previous audio files and their source identities. In some embodiments, historical data may indicate what features/aspects of a sound file and metadata tags (such as tags including ambient conditions) that may be important for identifying the source of a noise.

In a first example, a system designed to run method 200 is deployed to identify whale noises. In a second example, a system designed to identify a multitude of animal noises is deployed in a wooded area.

At block 210, a source category is identified, based on the current audio data. The source category may be the main subject of the current audio data. In some embodiments, audio data may be broken down into different categories. In some embodiments, the categories are animal groups such as the animal hierarchy of groupings, beginning with the kingdom animalia and proceeding through phyla, classes, orders, families, genera, and species. For example, one or more characteristics of a recording may immediately indicate that the sound was emitted by a particular family of animal. Following the first example from above, audio data from current audio data may be divided into a category of "whale noises" and a category of "non-whale noises" based on frequency, where everything from 10-100 hertz is classified as the whale noise category. In some embodiments, the categories may be a sound trait such as tone, frequency, volume, pitch, or timing. Following the second example from above, current audio data (e.g., a recording of a single noise, a recording of a series of noises, or a recording for a certain amount of time) may be tagged with a category of frequency range 10-20 hertz, maximum volume of 20 decibels, and/or repeating noise every 1.5 seconds.

Techniques for identifying the source category may include user selection, but they may additionally include automated techniques, such as audio recognition analysis (e.g., to identify features in an audio/sound file), anomaly recognition (e.g., to identify anomalies within audio/data), location determination (e.g., identifying a location where audio was generated, or determining a location at which an audio file was recorded), etc. Following the first example from above, the user may preselect "whale noises" and "non-whale noises" as the possible categories. Following the second example from above, the maximum volume may be automatically detected, and current audio data may be tagged with the maximum volume. In some embodiments, sound recordings, classifications, or source identities may be tagged with the place where the audio recording of current audio data took place. Following the first example, whale noises may only be present in certain areas at particular times of the year.

In some embodiments, the category identification may have an ambient noise range that is disregarded (not identified further), and any data outside the range may be identified a possible animal noise and analyzed for categories. Following the first example from above, the audio data below 10 Hertz may be disregarded as ambient noise. In some embodiments, neural networks may be employed to identify the source category (e.g., cognitive audio analysis, etc.) when current audio data falls outside of ambient noise ranges. For example, if the system is searching for crickets and the system records noises outside of a cricket's normal frequency, the system may tag the noise as "not cricket." In some embodiments, the category may be based on an identified characteristic. For example, an identified source may be tagged with the factors (e.g., frequency, pitch, temperature, etc.) that were used to identify the source in a recording. In some embodiments, a user may be notified if a source is identified. For example, if a certain species of bird is being sought and it is detected, the system may immediately send a notification to a user. The notification may be an audible noise, a wireless message, or any other form of notification that is consistent with this disclosure.

At block 215, a relevance score for the identified source category is generated from the current audio data. In some embodiments, multiple categories may be identified for a single noise or section of the current audio data. For example, a single sound recording in the current audio data may be tagged with categories of high frequency and possible cricket.

In embodiments, a relevance score may be based on a continuum (e.g., "similar" to "unrelated") , or it may be multidimensional. A multidimensional relevance score may be a point plotted within one or more 3D models where the axes (such as volume, frequency, and tone, etc.) define a given analyzed component of the relevance score. For example, a single noise at or just below a threshold may be tagged with a low relevance score for the "high pitch" category, and a noise with a high pitch may be tagged with a high relevance sore for the "high pitch" category. Following the first example from above, a sound in the current audio data with a 50 hertz frequency (inside the whale range) may be marked with a high relevance score, whereas a sound in the current audio data at 9hertz (just outside of the whale range) may be marked with a low relevance score. In some embodiments, the relevance score may be a numerical score based on the degree of similarity between the source and the category. For example, following the second example from above, an audio segment with a maximum volume of 10 decibels may have a relevance score of 1, whereas an audio segment with a maximum volume with of 7 decibels may have a match score of 0.7.

At block 220, a set of historical recording data is identified, based on the source category. In some embodiments, the historical data may include audio data files or sound files with source features (e.g., one or more source identities, length of a noise, if the communication included a single animal or multiple animals together, etc.) and related external information (e.g., temperature, time of day, etc.). In embodiments, a historical recording data repository may be pre-defined (e.g., a particular file folder on a computing device), or it may be undefined (e.g., the set of historical recording data may be fetched from the Internet, by searching an entire disk drive within the computing device, by scanning multiple shared folders over multiple devices, by searching relevant historical recording databases, etc.).

In embodiments, the set of historical recording data may have metadata tags that already describe particular data ranges that should be investigated further. In such cases, the metadata tags with appropriate actions may be identified and returned by the search. In some embodiments, the set of historical recording data may have metadata tags that indicate what further steps should be taken. For example, when a sound with a high frequency is found (for example, based on current audio data received in block 205), a historical recording data with a similar high frequency may be identified. A metadata tag on the similar scan may indicate that the previous high frequency sound was made by a cricket.

At block 230, the audio recording may be analyzed based on an identified set of historical data to identify a source. In some embodiments, the historical data may be analyzed to determine source features (e.g., one or more source identities, length of a noise, if the communication included a single animal or multiple animals together, etc.) and related external information (e.g., temperature, time of day, etc.) within audio data files or sound files. In some embodiments, the system may compare the key features of the historical data to determine if it matches the recorded data. One or more characteristics of the historical data that match one or more characteristics of the recording may be determined. Following the first example from above, if the current audio data contains frequencies that range from only from 16-19 hertz it may search available historical data and find baleen whales recordings with 15-20 hertz readings and identify a current audio data source identity as baleen whales. For example, if a recording in the current audio data has 100 chirps in a minutes at 60 degrees Fahrenheit, and a historical data set has 103 chirps in a minutes at 62 degrees, the historical data may be considered a match and the source identity of the historical data may be used for the source identity of the recording.

In some embodiments, the analyzing may include assigning a similarity score to one or more sets of data. The closer the data in the historical recording data matches the current audio data the higher the similarity score. Following the first example from above, the 16-19 hertz readings may have a similarity score of 100% with a historical recording data file containing 15-20 hertz readings, whereas readings from 18-25 hertz may only have a similarity score of 20% to a recording with a historical recording data file containing 15-20 hertz readings.

Figure 3:
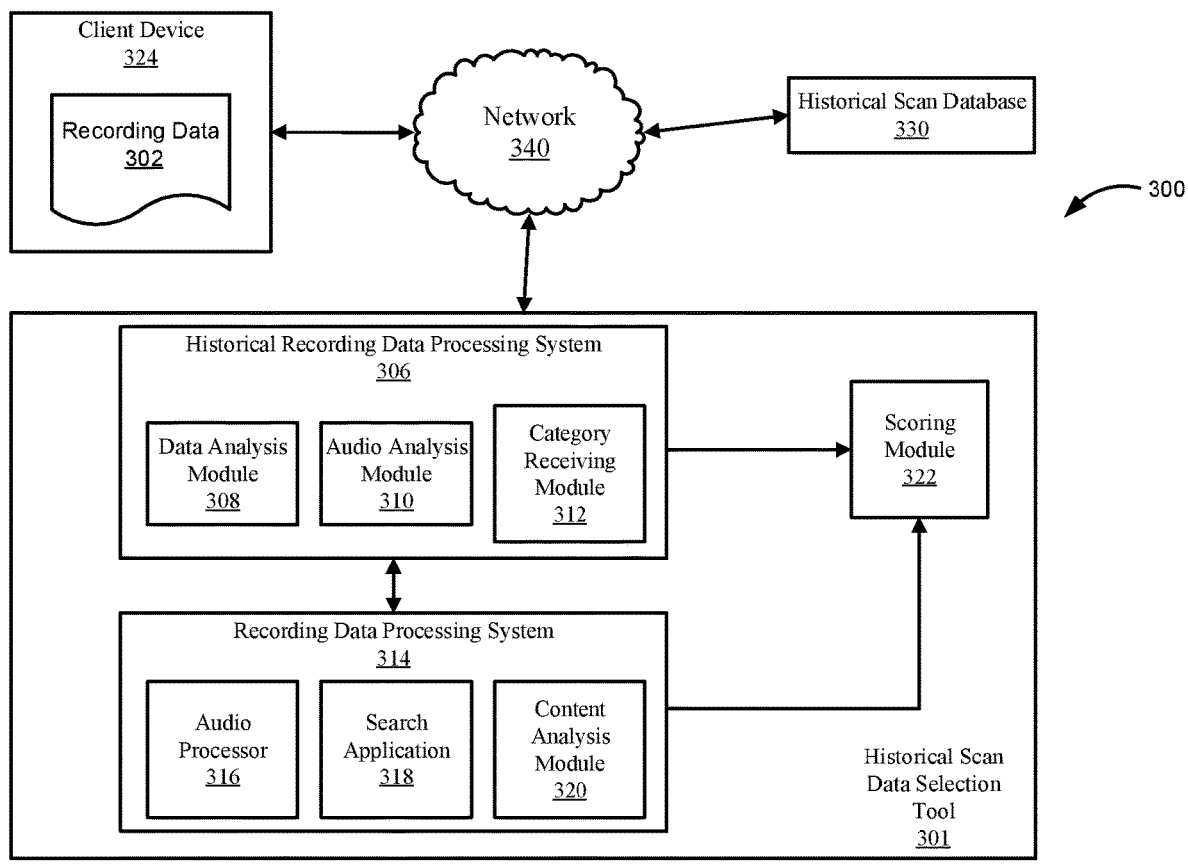
FIG. 3 is a block diagram illustrating an example networking environment according to various embodiments of the present disclosure.

Turning now to FIG. 3, illustrated is an example networking environment 300, in accordance with embodiments of the present disclosure. Networking environment 300 may include a client device 324, historical recording database 330, network 340, and a historical recording data selection tool 301 (e.g., a system) for historical recording data selection based on source category and scan type. Historical recording data selection tool 301 may be implemented as an application running on a user's computing device, as a service offered via the cloud, as a web browser plugin, as a smartphone application, or as a codependent application attached to a secondary application (e.g., as an "overlay" or a companion application to a partner application, such as a text messaging application).

Network 340 may be any type or combination of networks. For example, network 340 may include any combination of personal area network (PAN), local area network (LAN), metropolitan area network (MAN), wide area network (WAN), wireless local area network (WLAN), storage area network (SAN), enterprise private network (EPN), or virtual private network (VPN). In some embodiments, the network 340 may refer to an IP network, a conventional coaxial-based network, etc. For example, a server storing historical recording database 330 may communicate with various client devices (e.g. tablets, laptops, smartphones, portable terminals, client device 324, etc.) over the Internet.

In some embodiments, the network 340 may be implemented within a cloud computing environment, or using one or more cloud computing services. Consistent with various embodiments, a cloud computing environment may include a network-based, distributed data processing system that provides one or more cloud computing services. Further, a cloud computing environment may include many computers (e.g., hundreds or thousands of computers or more) disposed within one or more data centers and configured to share resources over the network 340. Cloud computing is discussed in greater detail in regard to FIGS. 5 & 6.

Client device 324 may be a desktop, laptop, smartphone, tablet, or any other suitable computing device for a user to interact with and execute the methods/techniques described herein. In embodiments, client device 324 may store one or more sets of recording data, such as recording data 302. As described herein, recording data 302 may be a written data, an audio stream, etc.

Historical recording database 330 may store a wide variety of historical recording data, as contemplated herein. For example, historical recording data may include recording data, audio files, sound recordings, audio recordings (e.g., crickets chirp), textual documents with sound information, visual representations of sound information or any other type of historical recording data an author/user of recording data 302 may wish to add or use in conjunction with recording data 302. In embodiments, historical recording database 330 may reside on a single server, on multiple servers within a cloud computing environment, and/or on the client device 324 or on the same physical system or virtualized system as historical recording data selection tool 301.

Historical recording data selection tool 301 may be a standalone computing system, such as a desktop or laptop; a server; or a virtualized system running on one or more servers within a cloud computing environment. Historical recording data selection tool 301 may include historical recording data processing system 306, recording data processing system 314, and scoring module 322.

In embodiments, recording data 302 may be received at by the historical recording data selection tool 301 via the network 340. The recording data processing system 314 may include, e.g., an audio processor 316, a search application 318, and a content analysis module 320.

In embodiments, the audio processor 316 may be configured to analyze historical scans to identify one or more source categories. In embodiments, audio processor 316 may further be configured to receive identify features of anomalies, from which source categories may then be identified.

As source categories are identified, relevance scores may be generated to determine one or more features (pitch, tone, frequency, duration, etc.), of the historical recording data with regard to the identified source category via content analysis module 320. In embodiments, content analysis module 320 may include, or store information in, a relational database linking one or more features to one or more other features. For example, a sound recording may have a higher temperature combined with increased chirp frequency, where either individually may not be an abnormality. In other embodiments, content analysis module 320 may include a convolutional neural network to generate a relevance score. In yet other embodiments, the content analysis module 320 may include, for example, both a relational database and a convolutional neural network, and may use the data from the relational database as input for the convolutional neural network. Relevance scores may be output to scoring module 322 for similarity scoring.

Search application 318 may be employed to find a set of historical recording data by searching historical recording database 330 for the source category identified by audio processor 316. As described herein, historical recording database 330 may include a pre-defined file folder or computer, or it may be construed as a collection of websites, computers, servers, etc. Search results may be returned to the historical recording data processing system 306.

In some embodiments, the historical recording data processing system 306 may include, e.g., a data analysis module 308, an audio analysis module 310, and a category receiving module 312. The category receiving module 312 may be configured to receive, from the recording data processing system 314, source categories identified by analyzing areas of recording data 302 that are necessarily related to the set of historical recording data retrieved by search application 318.

For example, in embodiments, sound recognition may be employed, as part of recording data processing system 314, to identify a particular pitch or tone. A superclass for the pitch or tone may be determined by parsing a relational database for the sound, and the superclass may be assigned as a source category. After identifying source categories, the recording data processing system 314 may transmit data regarding the source categories to the category receiving module 312, as the sound attributes may inform the identification of audio attributes by the audio analysis module 310, or data analysis module 308, respectively.

Based on digital file formats (e.g., audio formats, and sound recording file formats (e.g., .mp3 and .wmv)), historical recording data processing system 306 may determine with which processing module (e.g., data analysis module 308 or audio analysis module 310) the system should use to analyze the historical recording data received in response to the results of the search application 318's results. In embodiments where audio historical recording data is received, analysis of the historical recording data may be performed at, for example, recording data processing system 314. In other embodiments, historical recording data processing system 306 may include its own recording data processor (not shown).

In embodiments, audio analysis module 310 may be configured to receive sound recording and audio formats to identify objects, locations, points of interest, etc. (e.g., subjects) within audio files, as described herein. In embodiments where a sound recording file is received, still frame audio files may be selected at random intervals, at regular intervals, or a "best audio" (e.g., audio that gives an example of a blue jay most clearly) may be selected according to still audio selection criteria.

In embodiments, audio analysis module 310 may be configured to identify (e.g., from a sound recording, or a portion of a sound feed), a feature (e.g., pitch, tone, frequency, etc.). Audio analysis module 310 may further identify, given the combination of objects in the audio, the context of the audio. Audio analysis module 310 may perform the analysis techniques described herein to output a probability of a particular source for an analyzed audio, based on the received source category.

Once the objects, attributes, context, and relevance score of an audio have been identified, the audio may be "tagged" or otherwise annotated with a list or table reflecting this information (e.g., as metadata) and stored in historical recording database 330. Relevance scores generated by audio analysis module 310 are sent to scoring module 322.

In embodiments, as discussed herein, scoring module 322 may be used to generate similarity scores based on the received relevance scores for both the content and the historical recording data, as discussed herein.

In embodiments, scoring module 322 may employ a neural network to generate similarity scores, as described herein. In embodiments, a neural network may be a multi-layer perceptron, a system of sigmoid neurons, a directed acyclic graph comprising a plurality of corelets, or any other structure/system capable of neural networking.

Scoring module 322 may select, based on the similarity scores, one or more audio files from the historical recording data to display to the user, as described herein. The parameters for the selection may include a single dataset with the greatest similarity score, or it may be a subset of historical recording data (e.g., the ten historical recording data with the greatest similarity scores). Selection parameters may be adjustable.

Artificial neural networks (ANNs) may be computing systems modeled after the biological neural networks found in animal brains. Such systems learn (i.e., progressively improve performance) to do tasks by considering examples, generally without task-specific programming. For example, in sound recognition, ANNs might learn to identify sounds that are made by blue jays by analyzing example audio files (sometimes referred to herein as "training data") that have been manually labeled as "blue jay" or "no blue jay" and using the analytic results to identify blue jays in other audio files.

In some embodiments of the present disclosure, neural networks may be used to identify animal information in audio data. Neural networks may be trained to recognize patterns in input data by a repeated process of propagating training data through the network, identifying output errors, and altering the network to address the output error. Training data may be propagated through the neural network, which recognizes patterns in the training data. Those patterns may be compared to patterns identified in the training data by the human annotators in order to assess the accuracy of the neural network. In some embodiments, mismatches between the patterns identified by a neural network and the patterns identified by human annotators may trigger a review of the neural network architecture to determine the particular neurons in the network that contribute to the mismatch. Those particular neurons may then be updated (e.g., by updating the weights applied to the function at those neurons) in an attempt to reduce the particular neurons' contributions to the mismatch. In some embodiments, random changes are made to update the neurons. This process may be repeated until the number of neurons contributing to the pattern mismatch is slowly reduced, and eventually, the output of the neural network changes as a result. If that new output matches the expected output based on the review by the human annotators, the neural network is said to have been trained on that data.

In some embodiments, once a neural network has been sufficiently trained on training data sets for a particular subject matter, it may be used to detect patterns in analogous sets of live data (i.e., non-training data that has not been previously reviewed by human annotators, but that are related to the same subject matter as the training data). The neural network's pattern recognition capabilities may then be used for a variety of applications. For example, a neural network that is trained on a particular subject matter may be configured to review live data for that subject matter and predict the probability that a potential subject made a noise in the data.

In some embodiments, a multilayer perceptron (MLP) is a class of feedforward artificial neural networks. An MLP consists of, at least, three layers of nodes: an input layer, a hidden layer, and an output layer. Except for the input nodes, each node includes a neuron that uses a nonlinear activation function. MLP utilizes a supervised learning technique called backpropagation for training. Its multiple layers and non-linear activation distinguish MLP from a linear perceptron. It may distinguish data that is not linearly separable. Also, MLP may be applied to perform regression operations.

Figure 4:
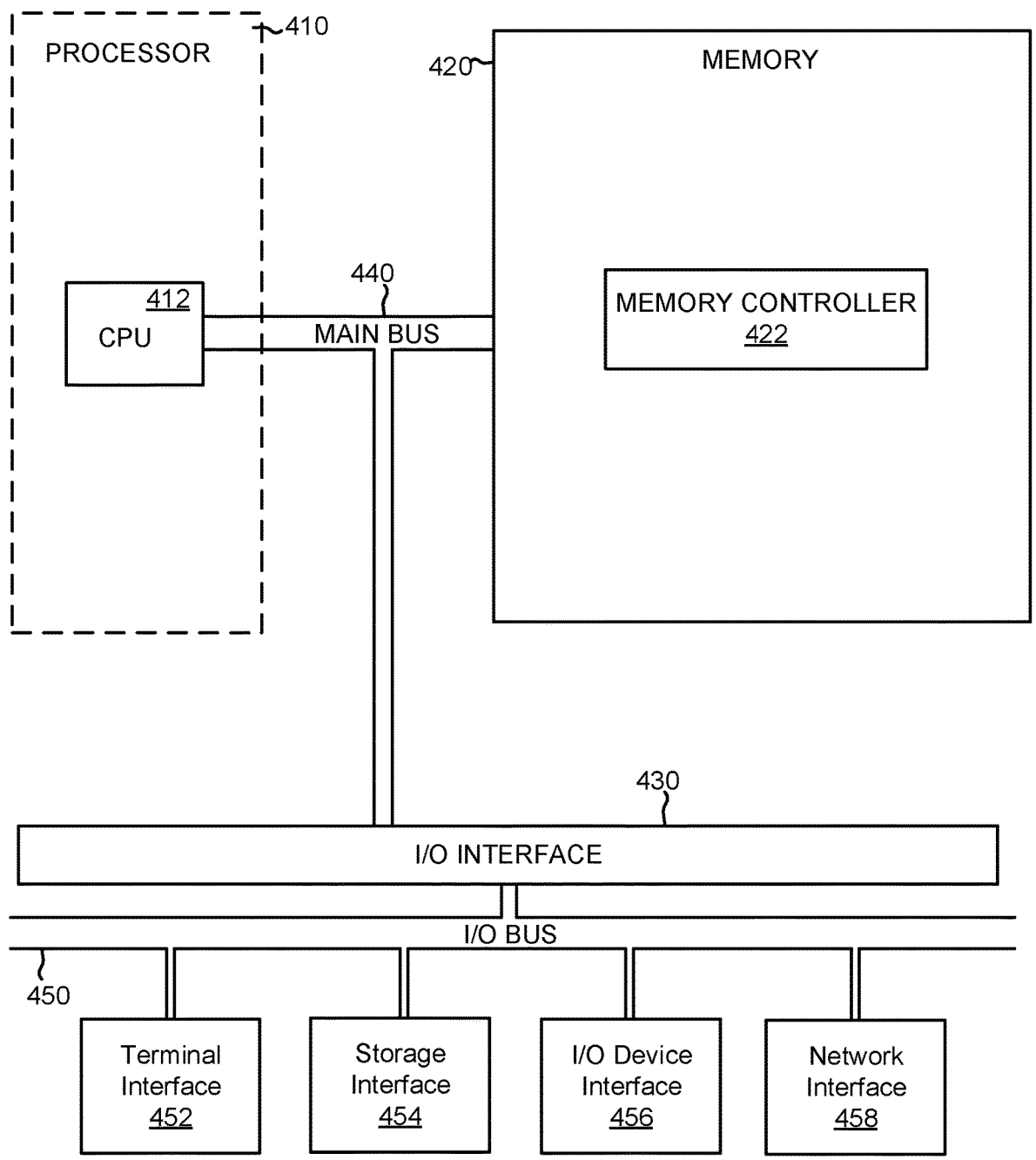
FIG. 4 depicts a computer system according to various embodiments of the present disclosure.

FIG. 4 depicts the representative major components of an exemplary Computer System 401 that may be used in accordance with embodiments of the present disclosure. The particular components depicted are presented for the purpose of example only and are not necessarily the only such variations. The Computer System 401 may comprise a Processor 410, Memory 420, an Input/Output Interface (also referred to herein as I/O or I/O Interface) 430, and a Main Bus 440. The Main Bus 440 may provide communication pathways for the other components of the Computer System 401. In some embodiments, the Main Bus 440 may connect to other components such as a specialized digital signal processor (not depicted).

The Processor 410 of the Computer System 401 may be comprised of one or more CPUs 412. The Processor 410 may additionally be comprised of one or more memory buffers or caches (not depicted) that provide temporary storage of instructions and data for the CPU 412. The CPU 412 may perform instructions on input provided from the caches or from the Memory 420 and output the result to caches or the Memory 420. The CPU 412 may be comprised of one or more circuits configured to perform one or methods consistent with embodiments of the present disclosure. In some embodiments, the Computer System 401 may contain multiple Processors 410 typical of a relatively large system. In other embodiments, however, the Computer System 401 may be a single processor with a singular CPU 412.

The Memory 420 of the Computer System 401 may be comprised of a Memory Controller 422 and one or more memory modules for temporarily or permanently storing data (not depicted). In some embodiments, the Memory 420 may comprise a random-access semiconductor memory, storage device, or storage medium (either volatile or non-volatile) for storing data and programs. The Memory Controller 422 may communicate with the Processor 410, facilitating storage and retrieval of information in the memory modules. The Memory Controller 422 may communicate with the I/O Interface 430, facilitating storage and retrieval of input or output in the memory modules. In some embodiments, the memory modules may be dual in-line memory modules.

The I/O Interface 430 may comprise an I/O Bus 450, a Terminal Interface 452, a Storage Interface 454, an I/O Device Interface 456, and a Network Interface 458. The I/O Interface 430 may connect the Main Bus 440 to the I/O Bus 450. The I/O Interface 430 may direct instructions and data from the Processor 410 and Memory 420 to the various interfaces of the I/O Bus 450. The I/O Interface 430 may also direct instructions and data from the various interfaces of the I/O Bus 450 to the Processor 410 and Memory 420.

The various interfaces may comprise the Terminal Interface 452, the Storage Interface 454, the I/O Device Interface 456, and the Network Interface 458. In some embodiments, the various interfaces may comprise a subset of the aforementioned interfaces (e.g., an embedded computer system in an industrial application may not include the Terminal Interface 452 and the Storage Interface 454).

Logic modules throughout the Computer System 401—including but not limited to the Memory 420, the Processor 410, and the I/O Interface 430—may communicate failures and changes to one or more components to a hypervisor or operating system (not depicted). The hypervisor or the operating system may allocate the various resources available in the Computer System 401 and track the location of data in Memory 420 and of processes assigned to various CPUs 412. In embodiments that combine or rearrange elements, aspects of the logic modules' capabilities may be combined or redistributed. These variations may be apparent to one skilled in the art.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
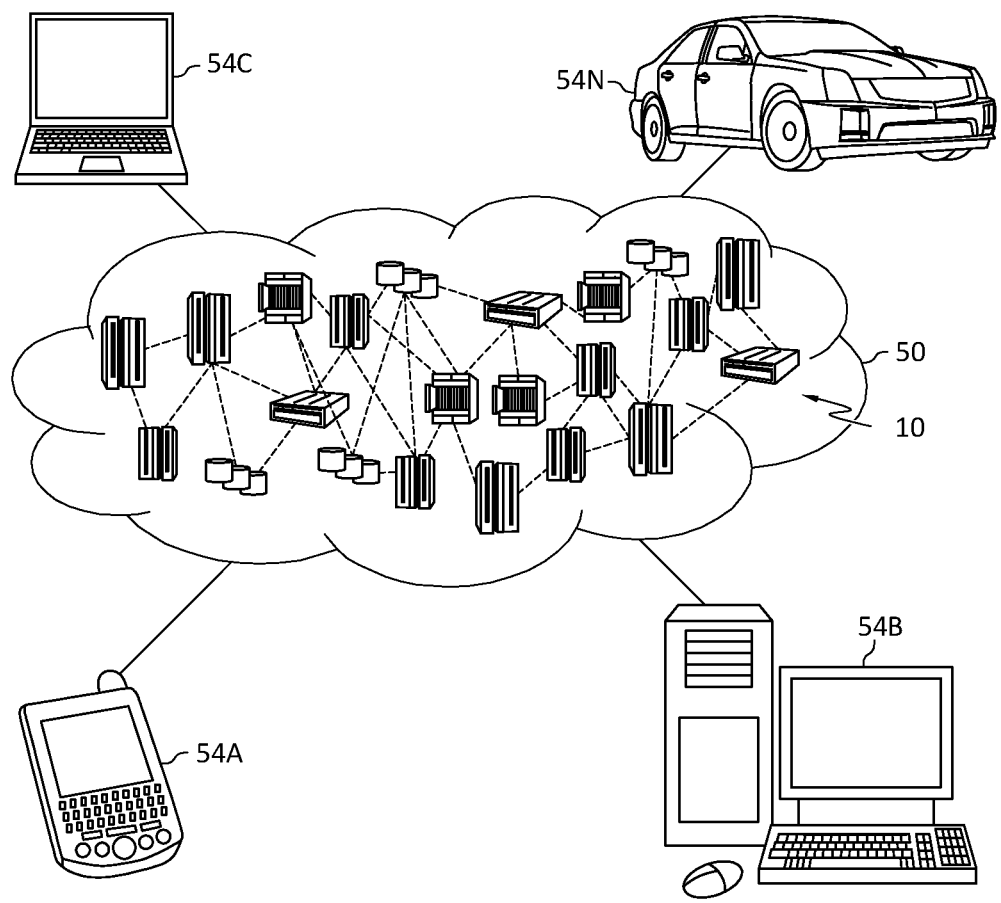
FIG. 5 depicts a cloud computing environment according to an embodiment of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
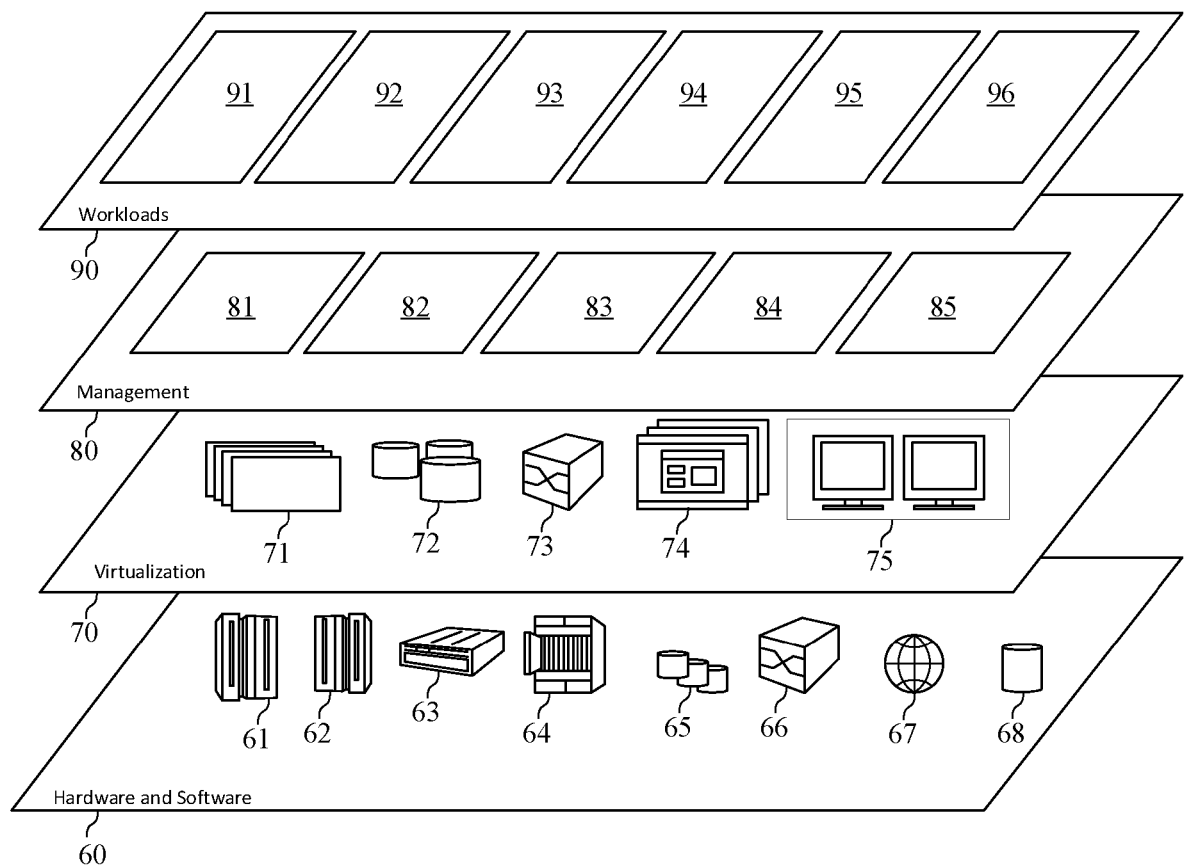
FIG. 6 depicts abstraction model layers according to an embodiment of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and predictive neural networks 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As used herein, a "set" of an object does not equate to all available instances of that object. For example, if four files were available, a set of files may not contain all four files. Further, as used herein, the phrase "each of a set" of an object refers only to the instances of that object of that set. For example, if four files were available, the phrase "a set of two files from the four files, each of the files in the set being read only" may properly be interpreted as implying that two files (the two files in the set) are read only. The two files of the four available files that are not in the set may or may not be read only.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
   collecting, by a solar powered sound collection device, an animal audio signature,
      wherein the solar powered collection device uses a supercapacitor to store power;
   comparing the animal audio signature to a database of known animal audio signatures, wherein the database contains one or more identities for each of the known animal audio signatures;
   identifying, based on the comparing, a known animal audio signature that matches the collected animal audio signature; and
   transmitting an identity associated with the known animal audio signature to a data repository over a 5G wireless network.

2. The method of claim 1 further comprising:
   collecting ambient data; and
   comparing the ambient data to historical ambient data associated with the known animal audio signatures, wherein the identifying is further based on the comparing the ambient data to historical ambient data associated with the known animal audio signatures.

3. The method of claim 2, wherein the ambient data is selected from the group consisting of precipitation data, light data, temperature data, humidity data, and combinations thereof.

4. The method of claim 1 further comprising:
   measuring a current level of storage for the supercapacitor;
   determining that the supercapacitor does not have enough power for the transmitting; and
   holding the transmitting until the supercapacitor has reached a threshold level.

5. The method of claim 4, wherein the threshold level is enough power to perform the transmitting.

6. The method of claim 4, wherein the threshold level is enough power to perform the transmitting and continue comparing and identifying for a set period of time.

7. The method of claim 4, wherein the threshold level is dependent on a current light level reported by a solar cell.

8. The method of claim 1 further comprising:
   measuring a current level of storage for the supercapacitor;
   determining that the supercapacitor does not have enough power to perform the comparing and the identifying for a set period of time;
   storing the animal audio signature; and
   holding the comparing, the identifying, and the transmitting until the supercapacitor has reached a threshold level.

9. The method of claim 1 wherein the identity is tagged with a feature that was used to determine the identity.

10. A method comprising: collecting, by a sound collection device, an animal audio signature; comparing the animal audio signature to a database of known animal audio signatures, wherein the database contains one or more identities for each of the known animal audio signatures; identifying, based on the comparing, a known animal audio signature that matches the collected animal audio signature; and transmitting an identity associated with the known animal audio signature to a data repository; collecting ambient data; and comparing the ambient data to historical ambient data associated with the known animal audio signatures, wherein the identifying is further based on the comparing the ambient data to historical ambient data associated with the known animal audio signatures.

11. The method of claim 10, determining a likelihood that the known animal audio signature matches the collected animal audio signature.

12. The method of claim 10, wherein the ambient data is selected from the group consisting of precipitation data, light data, temperature data, humidity data, and combinations thereof.

13. The method of claim 10 further comprising:
   measuring a current level of storage for a supercapacitor, wherein collection device is a solar powered collection device that uses the supercapacitor to store power;
   determining that the supercapacitor does not have enough power for the transmitting; and
   holding the transmitting until the supercapacitor has reached a threshold level.

14. The method of claim 13, wherein the threshold level is enough power to perform the transmitting.

15. The method of claim 13, wherein the threshold level is enough power to perform the transmitting and continue comparing and identifying for a set period of time.

16. The method of claim 13, wherein the threshold level is dependent on a current light level reported by a solar cell.

17. The method of claim 10 further comprising:
   measuring a current level of storage for a supercapacitor, wherein collection device is a solar powered collection device that uses the supercapacitor to store power;
   determining that the supercapacitor does not have enough power to perform the comparing and the identifying for a set period of time;
   storing the animal audio signature; and
   holding the comparing, the identifying, and the transmitting until the supercapacitor has reached a threshold level.

18. The method of claim 10 wherein the identity is tagged with a feature that was used to determine the identity.

19. A computer program product, the computer program product comprising a computer readable storage medium having program instructions embodied therewith, the program instructions executable by a computer to cause the computer to:
   collect, by a solar powered sound collection device connected to the computer, an animal audio signature,
      wherein the solar powered collection device uses a supercapacitor to store power;
   compare the animal audio signature to a database of known animal audio signatures,
      wherein the database contains one or more identities for each of the known animal audio signatures;
   identify, based on the comparing, a known animal audio signature that matches the collected animal audio signature; and transmit an identity associated with the known animal audio signature to a data repository over a 5G wireless network.

* * * * *